(12) United States Patent
Hsiao et al.

(10) Patent No.: US 8,525,814 B2
(45) Date of Patent: Sep. 3, 2013

(54) SYSTEM AND METHOD OF DISTINGUISHING MULTIPLE TOUCH POINTS APPLIED TO AN OPTICAL TOUCH SYSTEM

(75) Inventors: Chih-Chieh Hsiao, Taichung (TW); Chin-Chin Chen, Zhonghe (TW)

(73) Assignee: Quanta Computer Inc., Tao Yuan Shien (TW)

( * ) Notice: Subject to any disclaimer, the term of this patent is extended or adjusted under 35 U.S.C. 154(b) by 889 days.

(21) Appl. No.: 12/630,148

(22) Filed: Dec. 3, 2009

(65) Prior Publication Data
US 2010/0321340 A1      Dec. 23, 2010

(30) Foreign Application Priority Data
Jun. 18, 2009 (TW) .............................. 98120431 A

(51) Int. Cl.
*G06F 3/042* (2006.01)
(52) U.S. Cl.
USPC ...................................... 345/175; 178/18.09
(58) Field of Classification Search
USPC ......................................................... 178/18.09
See application file for complete search history.

(56) References Cited

U.S. PATENT DOCUMENTS 7,432,914 B2 * 10/2008 Kobayashi et al. ............ 345/173
7,515,141 B2 *  4/2009 Kobayashi .................... 345/173

FOREIGN PATENT DOCUMENTS

JP        2006146816 A  *  6/2006

OTHER PUBLICATIONS

English machine translation of JP 2006146816A (Kobayashi et al., Coordinate Inputting Method and Device, published Jun. 2006).*

* cited by examiner

*Primary Examiner* — Hoa T Nguyen
*Assistant Examiner* — Mark Fischer
(74) *Attorney, Agent, or Firm* — McClure, Qualey & Rodack, LLP

(57) ABSTRACT

The invention discloses a method of distinguishing multiple touch points applied to an optical touch system which includes a panel for indicating a first touch point and a second touch point thereon and a camera unit for capturing an image relative to the first touch point and the second touch point. The image has a first dark area and a second dark area corresponding to the first touch point and the second touch point respectively. In the method, if it is observed that the first dark area and the second dark area merge into a first single dark area and a second single dark area at current time and previous time respectively, the respective positions of the first dark area and the second dark area are determined and the respective coordinates of the first touch point and the second touch point are also determined.

15 Claims, 7 Drawing Sheets

SYSTEM AND METHOD OF DISTINGUISHING MULTIPLE TOUCH POINTS APPLIED TO AN OPTICAL TOUCH SYSTEM

CROSS-REFERENCE TO RELATED APPLICATION

This utility application claims priority to Taiwan Application Serial Number 098120431, filed Jun. 18, 2009, which is incorporated herein by reference.

BACKGROUND OF THE INVENTION

1. Field of the Invention

This invention relates to a system and a method of distinguishing multiple touch points and more particularly relates to a system and a method of distinguishing multiple touch points applied to an optical touch system.

2. Description of the Prior Art

Recently, image display technique is constantly innovated. A touch screen that has an interactive human machine interface (HMI) provides direct message input for users. It has been part of an electronic product, such as ticket terminal, projector, lottery terminal or industrial automation system, introduced actively by associated manufactures.

When a user touches a screen by his finger, the finger blocks the light relative to a certain position of the screen and then an image captured by a camera unit has a dark area accordingly. A general technique of optical touch screen achieves the input purpose by transferring the position of the dark area in the image into a coordinate on the screen corresponding to the dark area. In general, the optical touch technique can correctly detect a single touch point. However, once the user indicates two or more touch points on the touch screen at the same time, incorrect coordinates of the touch points may be obtained to the touch screen. As shown in FIG. 6, when there are two touch points on the touch screen, the system calculates two set of touch points (Pa, Pb) and (Pa', Pb'). The incorrect coordinates therefore may be obtained.

In addition, for the camera unit, when one of the touch points is shaded by the other one (i.e. only a single shaded point or dark area on the captured image), it is difficult to calculate exact coordinates of the touch points respectively because of a lack of enough information of the touch points provided by the captured image.

In view of the above, the invention provides a system and a method of distinguishing multiple touch points.

SUMMARY OF THE INVENTION

The first scope of the invention is to provide a method of distinguishing multiple touch points, which is applied to an optical touch system including a panel and a camera unit. The panel is used for indicating a first touch point and a second touch point thereon. The camera unit is used for capturing an image relative to the first touch point and the second touch point. The image has a first dark area and a second dark area corresponding to the first touch point and the second touch point respectively.

According to an embodiment of the invention, the method includes the following steps of:

(a) judging whether the first dark area and the second dark area are a first single dark area currently;

(b) if the judging in the step (a) is YES, judging whether the first dark area and the second dark area are a second single dark area at a previous time;

(c) if the judging in the step (b) is YES, determining a position of the first dark area and a position of the second dark area according to a union dark area width of the first single dark area and a union dark area width of the second single dark area; and (d) determining coordinates of the first touch point and the second touch point according to the position of the first dark area and the position of the second dark area.

The second scope of the invention is to provide a system of distinguishing multiple touch points, which includes a panel, a camera unit, a store unit, a data processing module, and a program stored in the store unit. The panel is used for indicating a first touch point and a second touch point thereon. The camera unit is used for capturing an image relative to the first touch point and the second touch point. The image has a first dark area and a second dark area corresponding to the first touch point and the second touch point respectively. The store unit is also used for storing area information corresponding to the first touch point and the second touch point respectively. The program is capable of being accessed and executed by the data processing module to perform the method of distinguishing multiple touch points as the first scope of the invention, and it is not described more here.

The third scope of the invention is to provide a store medium for storing a program therein. The instruction is capable of being accessed and executed by the touch system of distinguishing multiple touch points as the second scope of the invention to perform the method of distinguishing multiple touch points as the first scope of the invention, and it is not described more here.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
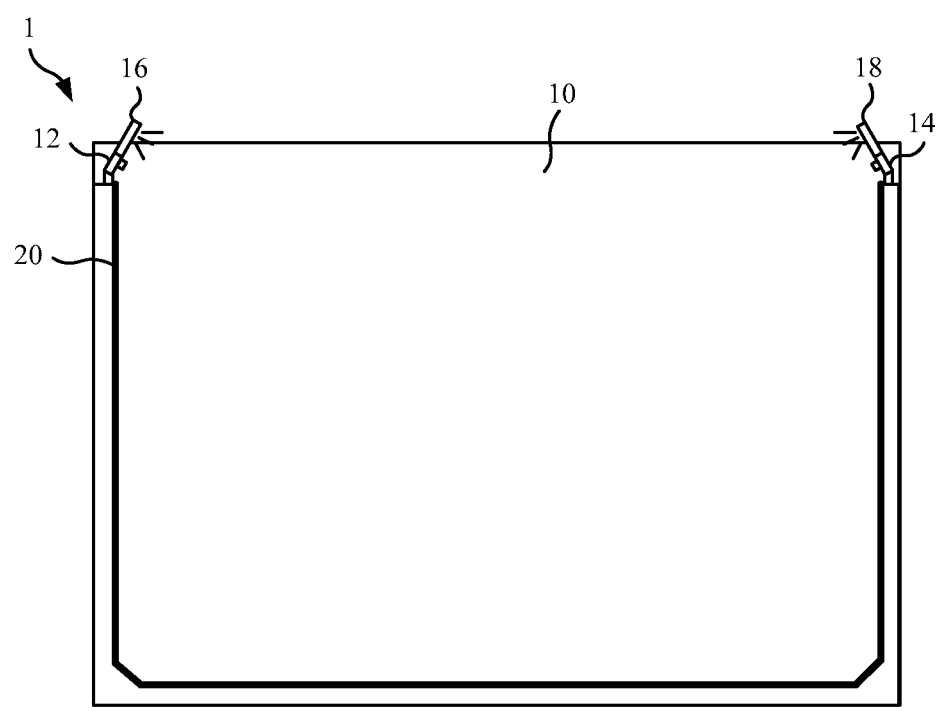
FIG. 1 is a schematic diagram illustrating a system of optically distinguishing multiple touch points according to a preferred embodiment of the invention.
Figure 2:
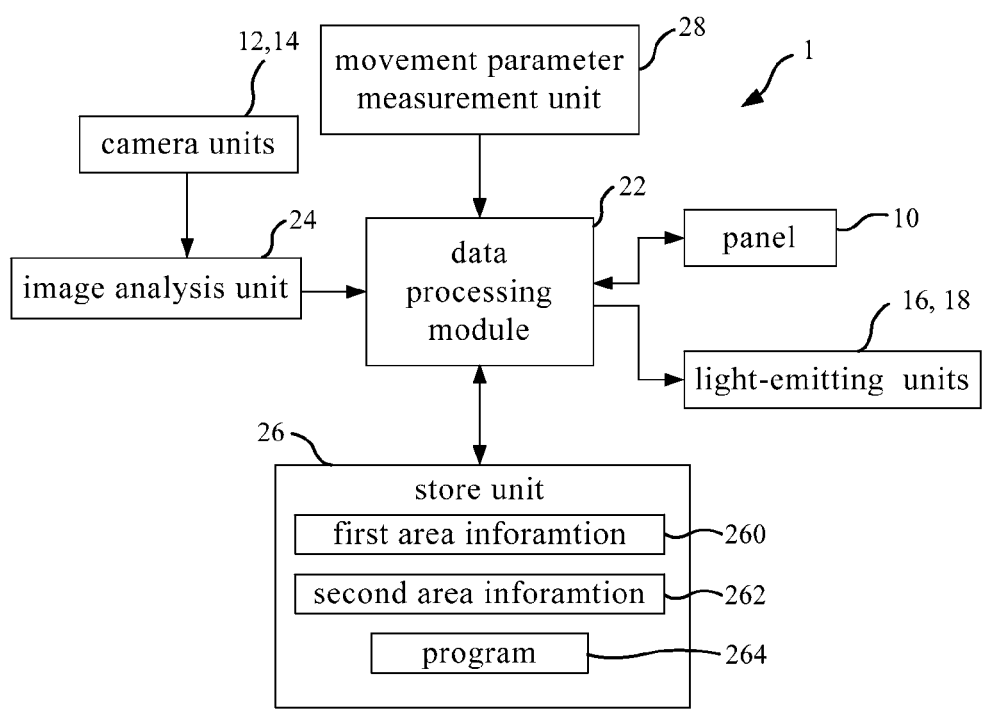
FIG. 2 is a function block diagram of the system of optically distinguishing multiple touch points according to the invention.

Please refer to FIG. 1 and FIG. 2. FIG. 1 is a schematic diagram illustrating a touch system or a system of optically distinguishing multiple touch points 1 according to a preferred embodiment of the invention. FIG. 2 is a function block diagram of the system of optically distinguishing multiple touch points 1 according to the invention.

The system of optically distinguishing multiple touch points 1 according to the invention includes a panel or screen 10, a first camera unit 12, a second camera unit 14, a data processing module 22, an image analysis unit 24, a movement parameter measurement unit 28, and a store unit 26. Therein, the data processing module 22 is coupled to the panel 10, the first camera unit 12, the second camera unit 14, the image analysis unit 24, the movement parameter measurement unit 28, and the store unit 26 respectively. The image analysis unit 24 is also coupled to the first camera unit 12 and the second camera unit 14. The store unit 26 stores a program 264 which is capable of being accessed and executed by the data processing module 22. In an embodiment, the data processing module 22, the movement parameter measurement unit 28, and the image analysis unit 24 could be a single electronic component or module; that is, the movement parameter measurement unit 28 and the image analysis unit 24 are integrated into or built in the data processing module 22, or the data processing module 22 itself could execute the functions of the movement parameter measurement unit 28 and the image analysis unit 24. In another embodiment, the data processing module 22, the image analysis unit 24, the movement parameter measurement unit 28, and the store unit 26 could be a single electronic component or module; that is, the image analysis unit 24, the movement parameter measurement unit 28, and the store unit 26 are integrated into or built in the data processing module 22, or the data processing module 22 itself could execute the functions of the movement parameter measurement unit 28, the image analysis unit 24, and the store unit 26. In another embodiment, the data processing module 22, the movement parameter measurement unit 28, the image analysis unit 24, and the store unit 26 are individual electronic components.

As shown in FIG. 1, in addition to the above components, the system of distinguishing multiple touch points 1 according to the invention also includes reflection units 20 disposed around the panel 10 and a first light-emitting unit 16 and a second light-emitting unit 18 disposed beside the first camera unit 12 and the second camera unit 14 respectively. Therein, light emitted by the first light-emitting unit 16 and the second light-emitting unit 18 is reflected by the reflection units 20 to form reflected light for the system of distinguishing multiple touch points 1 to detect the occurrence of touch. In another embodiment, there are light-emitting units disposed around the panel 10 for emitting light to detect the occurrence of touch. In practical application, the disposal of optical components of the system of distinguishing multiple touch points 1, except for the above two kinds, could be other kinds, and it is not limited to the above.

Figure 3A:
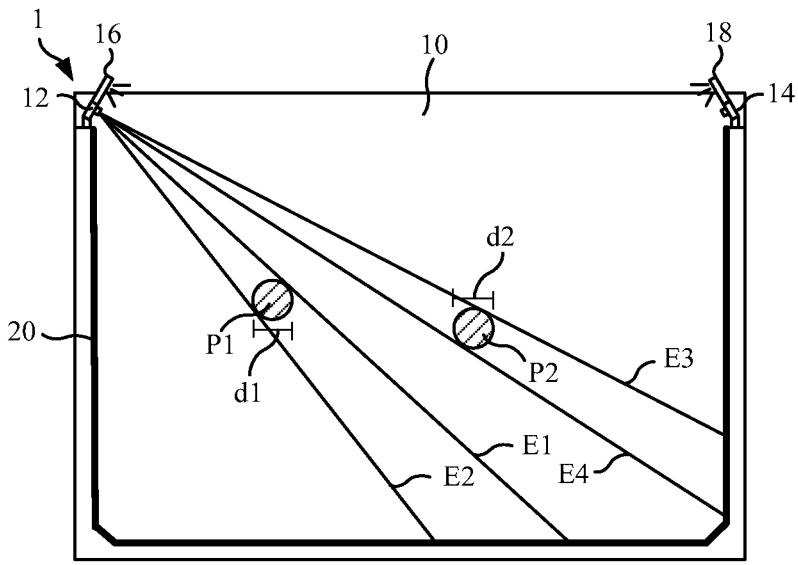
FIG. 3A is a schematic diagram illustrating the system of distinguishing multiple touch points with two touch points on a panel thereof.

Please refer to FIG. 3A. FIG. 3A is a schematic diagram illustrating the system of distinguishing multiple touch points 1 with two touch points on the panel 10. In practical application, a user could indicate a first touch point P1 and a second touch point P2 by his fingers. Furthermore, the quantity of the touch points on the panel 10 is not limited to two, even though the concept of the invention is illustrated by the embodiment with two touch points. It is noticed that the above indicating does not mean that the fingers have to physically touch the panel 10, and any path shading the light enough belongs to the above indicating.

The first camera unit 12 and the second camera unit 14 are used for capturing images relative to the first touch point P1 and the second touch point P2. In general (for example, the fingers of the user are separated from the view of camera units), the images captured by the first camera unit 12 and the second camera unit 14 respectively has a first dark area and a second dark area corresponding to the first touch point P1 and the second touch point P2. It is noticed that the first dark area and the second dark area are formed because the user blocks the light emitted by the first light-emitting unit 16 and the second light-emitting unit 18. Once the positions and the widths of the first dark area and the second dark area in the image are known, first area information of the first touch point P1, second area information of the second touch point P2, and coordinates of the first touch point P1 and the second touch point P2 on the panel 10 could be calculated respectively. Please refer to FIG. 3A. If the coordinate of the first touch point P1 and the second touch point P2 on the panel 10 are assumed to be Pa and Pb, the first area information could be for example the area, shape, circumference, touch point width d1 or diameter, coordinate Pa, or angle of the first touch point P1 covering the panel 10, and the second area information could be for example the area, shape, circumference, touch point width d2 or diameter, coordinate Pb, or angle of the second touch point P2 covering the panel 10. In addition, the image analysis unit 24 is used for analyzing the relation of the positions of the first dark area and the second dark area. It is noticed that the first dark area, the second dark area, the first area information, and the second area information correspond to different objects. The first dark area and the second dark area are dark areas shown in the images captured by the first camera unit 12 or the second camera unit 14. The first area information and the second area information are area information of the first touch point P1 and the second touch point P2 covering the panel 10. Correspondingly, if the coordinates and the widths d1 and d2 of the first touch point P1 and the second touch point P2 are known, the positions and the dark area widths of the first dark area and the second dark area could be deduced.

Figure 3B:
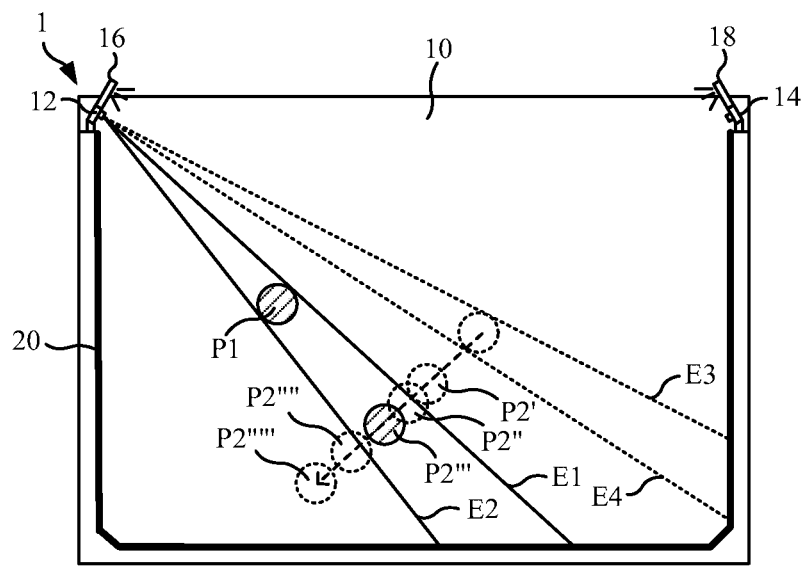
FIG. 3B is a schematic diagram illustrating the trace of one of the touch points in FIG. 3A.

Please refer to FIGS. 3A to 3B and FIGS. 4A to 4F. FIG. 3B is a schematic diagram illustrating the trace of the second touch point P2 relative to the first touch point P1 in FIG. 3A. FIGS. 4A to 4F are schematic diagrams illustrating the relation of positions of the first dark area 1200 and the second dark area 1202 on the image 120 captured by the first camera unit 12. It is noticed that the image 120 captured by the first camera unit 12 is an example of illustration to the embodiment of the invention, and the image captured by the second camera unit 14 is also applied.

Figure 4A:
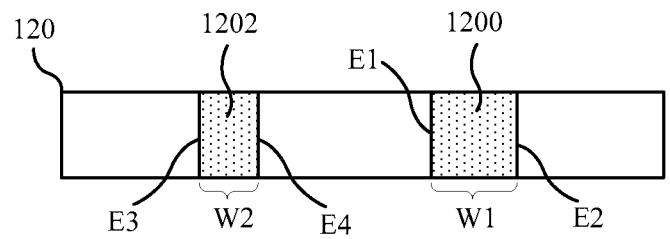
FIGS. 4A to 4F are schematic diagrams illustrating the relation of positions of a first dark area and a second dark area on an image captured by a camera unit.

When the first touch point P1 and the second touch point P2 are at the positions in the FIG. 3A, the image 120 captured by the first camera unit 12 is shown as in FIG. 4A. Obviously, the first dark area 1200 and the second dark area 1202 are separated. It is noticed that the status that the first dark area 1200 and the second dark area 1202 are separated could be defined as that the first touch point P1 and the second touch point P2 are at a status of un-shading before completely-shading. In addition, for the first camera unit 12, the first dark area 1200 and the second dark area 1202 have individual distribution ranges. For details, the first dark area 1200 has a dark area width W1, and the second dark area 1202 also has a dark area width W2. Further, the first dark area 1200 has boundaries E1 and E2, and the second dark area 1202 has boundaries E3 and E4.

Figure 4B:
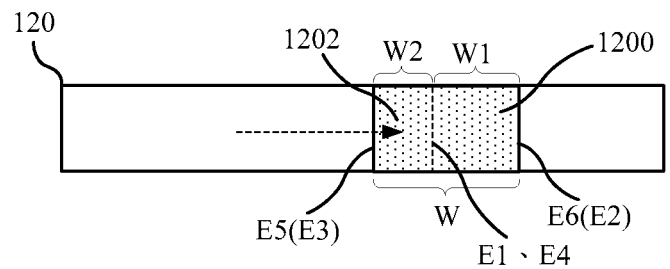

As shown in FIG. 3B, when the second touch point P2 moves along the shown movement trace relative to the first touch point P1, the relation of the positions of the first dark area 1200 and the second dark area 1202 varies. Therein, when the second touch point P2 arrives at P2', the first camera unit 12 captures an image of a single dark area formed by the first dark area 1200 and the second dark area 1202, as shown in FIG. 4B. Because the single dark area is formed by the first dark area 1200 and the second dark area 1202, the single dark area has a right boundary E6 (i.e. the boundary E2 of the first dark area 1200) and a left boundary E5 (i.e. the boundary E3 of the second dark area 1202) and also has a union dark area width W. Furthermore, the union dark area width W of the single dark area shown in FIG. 4B achieves a maximum (i.e. about the sum of the dark area width W1 and the dark area width W2). Therefore, the status that the first dark area 1200 and the second dark area 1202 forming the single dark area could be defined as a mergence moment status before completely-shading, and the union dark area width W of the single dark area achieves at the maximum at the mergence moment status before completely-shading.

Figure 4C:
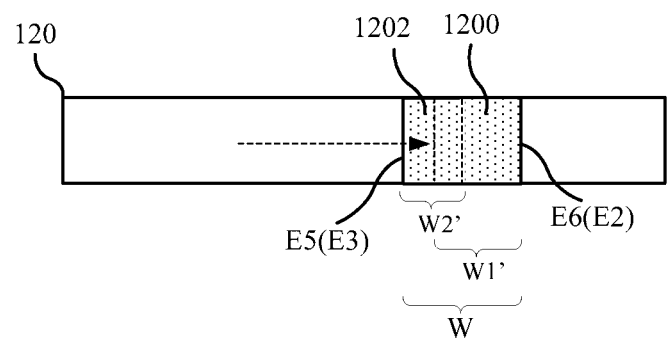

Afterward, when the second touch point P2 arrives at P2''', because the boundary E4 of the second dark area 1202 enters the distribution range of the first dark area 1200 (as shown in FIG. 4C), the union dark area width W of the single dark area becomes smaller and smaller to the first camera unit 12. It is noticed that this status could be defined as that the first touch point P1 and the second touch point P2 are at a status of incompletely-shading before completely-shading, and the union dark area width W of the single dark area at the status of incompletely-shading before completely-shading becomes smaller and smaller from the maximum.

It is noticed that because the sampling by the first camera unit 12 is performed in discrete time, if the image 120 captured by the first camera unit 12 at a previous time shows a separation status (i.e. the status of un-shading before completely-shading) and the image 120 captured by the first camera unit 12 at current time shows the single dark area (when the union dark area width W achieves at the maximum), it is possible that the boundary E4 of the second dark area 1202 has already entered the distribution range of the first dark area 1200 (i.e. at the status of incompletely-shading before completely-shading, that is P2''). That is, the image 120 showing the mergence moment status before completely-shading is not sampled exactly. No matter how it is, the union dark area width W of the single dark area still becomes smaller and smaller from the maximum afterwards. Therefore, for the invention, it is reasonable to ignore the mergence moment status before completely-shading (i.e. P2'), but it is directly considered from the status of un-shading before completely-shading (i.e. P2) to the status of incompletely-shading before completely-shading (i.e. P2'').

At this time, once the image analysis unit 24 analyzes the union dark area width W of the first dark area 1200 and the second dark area 1202 to start to become smaller at the current time(i.e. entering the status of incompletely-shading before completely-shading, that is P2''), the data processing module 22 stores first area information 260 corresponding to the first touch point P1 and second area information 262 corresponding to the second touch point P2 at the previous time into the store unit 26. In an embodiment, the first area information 260 and the second area information 262 respectively have the area, shape, circumference, coordinate, angle, touch point width d1 or diameter of the first touch point P1 and the second point P2 covering the panel 10, and the time and the coordinate of the second touch point P2 is also recorded. The recording of the time and the coordinate of the second touch point P2 is used for calculating the movement parameter of the second touch point P2, which is described in detail in the following. In an embodiment, the store unit 26 for storing the first area information 260 and the second area information 262 and the store unit 26 for storing the program 264 could be physically the same unit or different units.

Figure 4D:
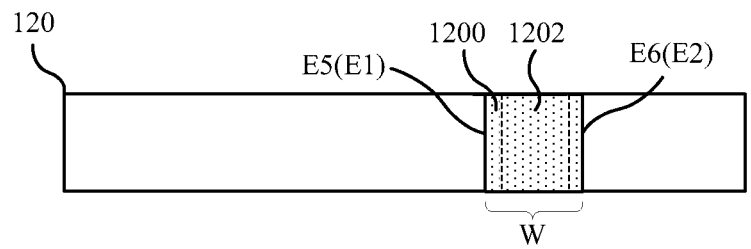

Afterward, when the second touch point P2 arrives at P2''', because the second dark area 1202 wholly enters the distribution range of the first dark area 1200 (as shown in FIG. 4D), the union dark area width W of the single dark area becomes a minimum (about the dark area width W1) to the first camera unit 12. It is noticed that this status could be defined as that the first touch point P1 and the second touch point P2 are at a completely-shading status, and the union dark area width W of the single dark area becomes the minimum at the completely-shading status.

Figure 4E:
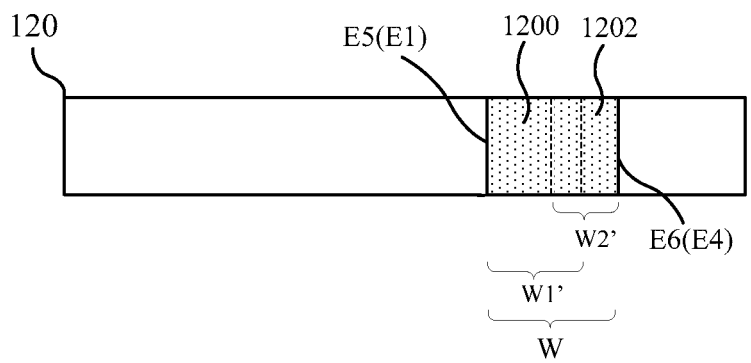

Afterward, when the second touch point P2 arrives at P2'''', because the boundary E4 of the second dark area 1202 is exposed out of the distribution range of the first dark area 1200 (as shown in FIG. 4E), the union dark area width W of the single dark area becomes larger and larger to the first camera unit 12. It is noticed that this status could be defined as that the first touch point P1 and the second touch point P2 are at a status of incompletely-shading after completely-shading, and the union dark area width W of the single dark area at the status of incompletely-shading after completely-shading becomes larger and larger from the minimum. It is also noticed that the difference between the status of incompletely-shading before completely-shading (i.e. P2'') and the status of incompletely-shading after completely-shading (P2'''') is that the relation of the positions of the first dark area 1200 and the second dark area 1202 is reversed (left-right reversed).

Figure 4F:
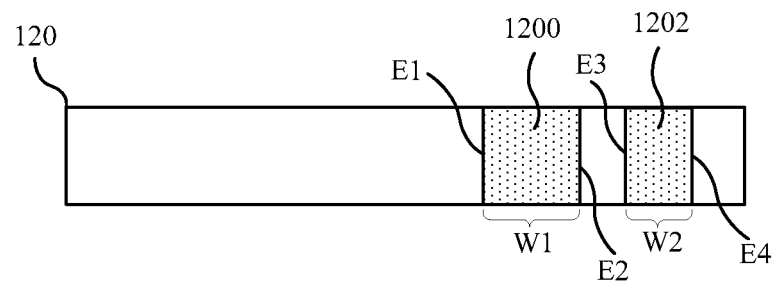

Afterward, when the second touch point P2 arrives at P2''''', the image analysis unit 24 finds that the single dark area divides into the first dark area 1200 and the second dark area 1202 again, as shown FIG. 4F. That is, the first dark area 1200 and the second dark area 1202 change to having individual distribution ranges from the union distribution range. This status could be defined as that the first touch point P1 and the second touch point P2 are at a status of un-shading after completely-shading. The image analysis unit 24 analyzes the first dark area 1200 and the second dark area 1202 to be separated from being united. It is noticed that the difference between the status of un-shading before completely-shading and the status of un-shading after completely-shading (P2''''') is that the relation of the positions of the first dark area 1200 and the second dark area 1202 is reversed (left-right reversed).

It is noticed that, in each of the above statuses, the dark areas corresponding to the first touch point P1 and the second touch point P2 captured by the second camera unit 14 are kept separated.

The following would show how the coordinate of the second touch point P2 is determined for each of the above statuses according to the invention.

First, when the first touch point P1 and the second touch point P2 are at the status of un-shading before completely-shading, because there is no shading or overlapping between the first dark area 1200 and the second dark area 1202, the coordinates and the touch point widths d1, d2 of the first touch point P1 and the second touch point P2 relative to the panel 10 could be obtained directly according to the positions and the dark area widths W1, W2 of the first dark area 1200 and the second dark area 1202.

As discussed above, for the invention, it is reasonable to ignore the mergence moment status before completely-shading (i.e. P2'), but it is directly considered from the status of un-shading before completely-shading to the status of incompletely-shading before completely-shading (i.e. P2''); that is, the single dark area which is captured for the first time is regarded as the status of incompletely-shading before completely-shading (i.e. P2'').

When the first touch point P1 and the second touch point P2 achieves the status of incompletely-shading before completely-shading, please refer to FIG. 3B and FIG. 4C. FIG. 3B is the schematic diagram illustrating that the two touch points on the panel 10 are at the status of incompletely-shading before completely-shading (i.e. P2''). FIG. 4C is the schematic diagram illustrating the relation of the positions of the first dark area 1200 and the second dark area 1202 when the two touch points are at the status of incompletely-shading before completely-shading (i.e. P2").

From the view of the first camera unit 12, the dark area width of the single dark area becomes smaller and smaller, and the single dark area has the right boundary E6 (i.e. the original boundary E2 of the first dark area 1200) and the left boundary E5 (i.e. the boundary E3 of the second dark area 1202). Similar to the above discussion, the coordinates and the touch point widths d1, d2 of the first touch point P1 and the second touch point P2 relative to the panel 10 could be deduced as long as the positions of the dark areas captured by the first camera unit 12 and the second camera unit 14 corresponding to the first touch point P1 and the second touch point P2 respectively are known. According to the invention, the current coordinates and the current dark area widths d1, d2 of the first touch point P1 and the second touch point P2 relative to the panel 10 are deduced by use of the positions and the dark area widths W1', W2' of the dark areas captured by the first camera unit 12 stored previously or at the previous time (i.e. the time before entering P2") in coordination with the positions and the dark area widths of the dark areas in the image currently captured by the second camera unit 14. Please refer to FIG. 4C. The data processing module 22 could determine the coordinates of the first touch point P1 and the second touch point P2 according to the left boundary E5 and the right boundary E6 of the single dark area and the previously-stored dark area width W2', W1'. For example, the position of the second dark area 1202 could be deduced by shifting rightward by the previously-stored dark area width W2' from the left boundary E5 of the single dark area. Similarly, the position of the first dark area 1200 could be deduced by shifting leftward by the previously-stored dark area width W1' from the right boundary E6. Further in coordination with the positions and the dark area widths of the dark areas in the image currently captured by the second camera unit 14, the coordinates and the touch point widths d1, d2 of the first touch point P1 and the second touch point P2 relative to the panel 10 are also deduced. Therefore, under this kind of status that the second touch point P2 is partially shaded by the first touch point P1, the data processing module 22 could still determine the positions of the first dark area 1200 and the second dark area 1202 so as to calculate the coordinates of the first touch point P1 and the second touch point P2 respectively. It is noticed that the previously-stored dark area widths W2', W1' are usable as long as they are obtained before the status of incompletely-shading before completely-shading (i.e. P2").

Then, when the first touch point P1 and the second touch point P2 enter the completely-shading status (i.e. P2''') from the status of incompletely-shading before completely-shading (i.e. P2"), please refer to FIG. 4D. The data processing module 22 determines the coordinate of the second touch point P2 according to the movement parameter (e.g. movement speed, acceleration, or inertia) of the second touch point P2. In an embodiment, the movement parameter could be determined according to the previously-stored coordinate and time. For example, when the coordinate at the status of un-shading before completely-shading and the time thereof are respectively (P2'x, P2'y) and t1, and the coordinate at the status of incompletely-shading before completely-shading (i.e. P2") and the time thereof are respectively (P2"x, P2"y) and t2, the movement parameter of the second touch point P2 is calculated to be [(P2"x−P2'x, P2"y−P2'y)]/(t2−t1). Thereby, when at the completely-shading status (i.e. P2'''), the position of the second dark area 1202 is predicted according to the movement parameter. Therefore, under this status, though the second touch point P2 has been shaded wholly by the first touch point P1, the data processing module 22 could still determine the position and the dark area width of the second dark area 1202 so as to calculate the coordinates of the first touch point P1 and the second touch point P2 respectively. In an embodiment, the movement parameter could further includes an acceleration of the second touch point P2 so as to predict the position of the second touch point P2 more exactly. It is noticed that as long as a plurality of the coordinates of the second touch point P2 and the times thereof are obtained before the completely-shading status (i.e. P2'''), the movement parameter could therefore be calculated. Moreover, when the times of storing coordinates of the second touch point P2 are closer to the completely-shading status, the position of the second dark area 1202 could be predicted more exactly according to the calculated movement parameter. Besides, if the sampling quantity of the movement parameter is more, the position of the second dark area 1202 could also be predicted more exactly according to the calculated movement parameter.

Then, when the first touch point P1 and the second touch point P2 enter the status of incompletely-shading after completely-shading (i.e. P2'''') from the completely-shading status (i.e. P2'''), please refer to FIG. 3B and FIG. 4E. FIG. 3B is the schematic diagram illustrating that the two touch points on the panel 10 are at the status of incompletely-shading after completely-shading (i.e. P2''''). FIG. 4E is the schematic diagram illustrating the relation of the positions of the first dark area 1200 and the second dark area 1202 when the two touch points are at the status of incompletely-shading after completely-shading (i.e. P2'''').

From the view of the first camera unit 12, the dark area width of the single dark area becomes larger and larger, and the single dark area has the left boundary E5 (i.e. the boundary E1 of the first dark area 1200) and the right boundary E6 (i.e. the boundary E4 of the second dark area 1202). Similar to the above discussion, the coordinates and the touch point widths d1, d2 of the first touch point P1 and the second touch point P2 relative to the panel 10 could be deduced as long as the positions and the dark area widths of the dark areas captured by the first camera unit 12 and the second camera unit 14 corresponding to the first touch point P1 and the second touch point P2 respectively are known. According to the invention, the current coordinates and the current dark area widths d1, d2 of the first touch point P1 and the second touch point P2 relative to the panel 10 are deduced by use of the positions and the dark area widths W1', W2' of the dark areas captured by the first camera unit 12 stored previously or at the previous time in coordination with the positions and the dark area widths of the dark areas in the image currently captured by the second camera unit 14. Please refer to FIG. 4E. The data processing module 22 could determine the coordinates of the first touch point P1 and the second touch point P2 according to the left boundary E5 and the right boundary E6 of the single dark area and the previously-stored dark area width W2', W1'. For example, the position of the second dark area 1202 could be deduced by shifting leftward by the previously-stored dark area width W2' from the right boundary E6 of the single dark area. Similarly, the position of the first dark area 1200 could be deduced by shifting rightward by the previously-stored dark area width W1' from the left boundary E5. Further in coordination with the positions and the dark area widths of the dark areas in the image currently captured by the second camera unit 14, the coordinates and the touch point widths d1, d2 of the first touch point P1 and the second touch point P2 relative to the panel 10 are also deduced. Therefore, under this kind of status that the second touch point P2 is partially shaded by the first touch point P1, the data processing module 22 could still determine the positions of the first dark area 1200 and the second dark area 1202 so as to calculate the coordinates of the first touch point P1 and the second touch point P2 respectively. It is noticed that the previously-stored dark area widths W2', W1' are usable as long as they are obtained before the status of incompletely-shading before completely-shading (i.e. P2").

Then, when the first touch point P1 and the second touch point P2 enter the status of un-shading after completely-shading (i.e. P2'''') from the status of incompletely-shading after completely-shading (i.e. P2'''), please refer to FIG. 4F. Once the image analysis unit 24 analyzes the first dark area 1200 and the second dark area 1202 to be separated from being united, the data processing module 22 could determine the coordinates of the first touch point P1 and the second touch point P2 respectively according to the first area information 260 and the second area information 262 previously stored.

Figure 6:
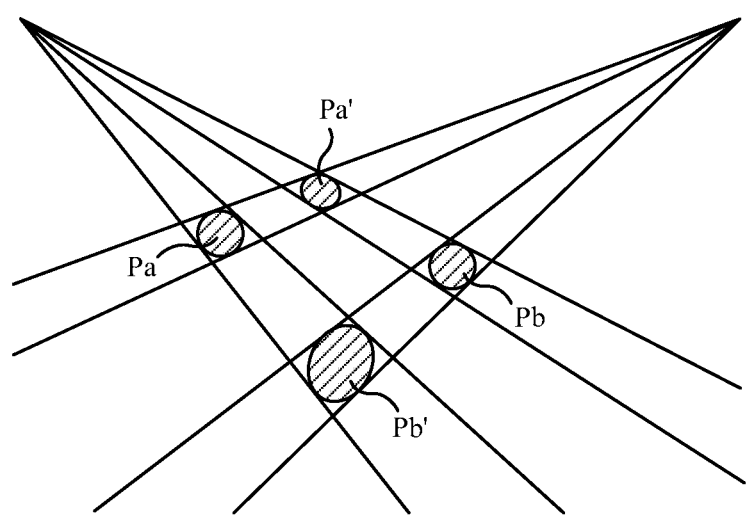
FIG. 6 is a schematic diagram illustrating two set of possible touch points calculated by a prior art optical touch system in the prior art.

According to ergonomics, during the movement of the touch point, the deformation of the touch point would be limited to a certain range. The data processing module 22 has stored the first area information 260 corresponding to the first touch point P1 and the second area information 262 corresponding to the second touch point P2 before the first touch point P1 and the second touch point P2 enter the status of incompletely-shading before completely-shading (i.e. P2"), so when the first touch point P1 and the second touch point P2 are at the status of un-shading after completely-shading (i.e. P2''''), the system would calculate the two possible set of touch points as shown in FIG. 6 (it is added that the two set of touch points have individual area information). The data processing module 22 compares the area information of the two set of touch points by use of the previously-stored first area information 260 and the previously-stored second area information 262, so as to select one set of touch points with smaller deformation as the coordinates of the first touch point P1 and the second touch point P2. In an embodiment, the calculation of the deformation could be performed by comparing the previously-stored first area information 260 and the previously-stored second area information 262 with one of area, shape, circumference, and touch point width which are stored within the current area information. Therefore, even if an error prediction occurs when the second touch point P2 is at the completely-shading status (i.e. P2'''), it would be corrected so as to determine the correct coordinate once the second touch point P2 arrives at the status of un-shading after completely-shading (i.e. P2''''). It is effective to avoid the error of misjudging the touch points.

Thereby, the coordinates of the first touch point P1 and the second touch point P2 with shading could be predicted according to the invention. It is noticed more that even if the prediction of movement of the second touch point P2 fails (for example, not moving at the completely-shading status (i.e. P2''') in accordance with the movement parameter), the data processing module 22 could still correct and determine the coordinates of the first touch point P1 and the second touch point P2 respectively once the first touch point P1 and the second touch point P2 enter the status of un-shading after completely-shading (i.e. P2'''').

Figure 5:
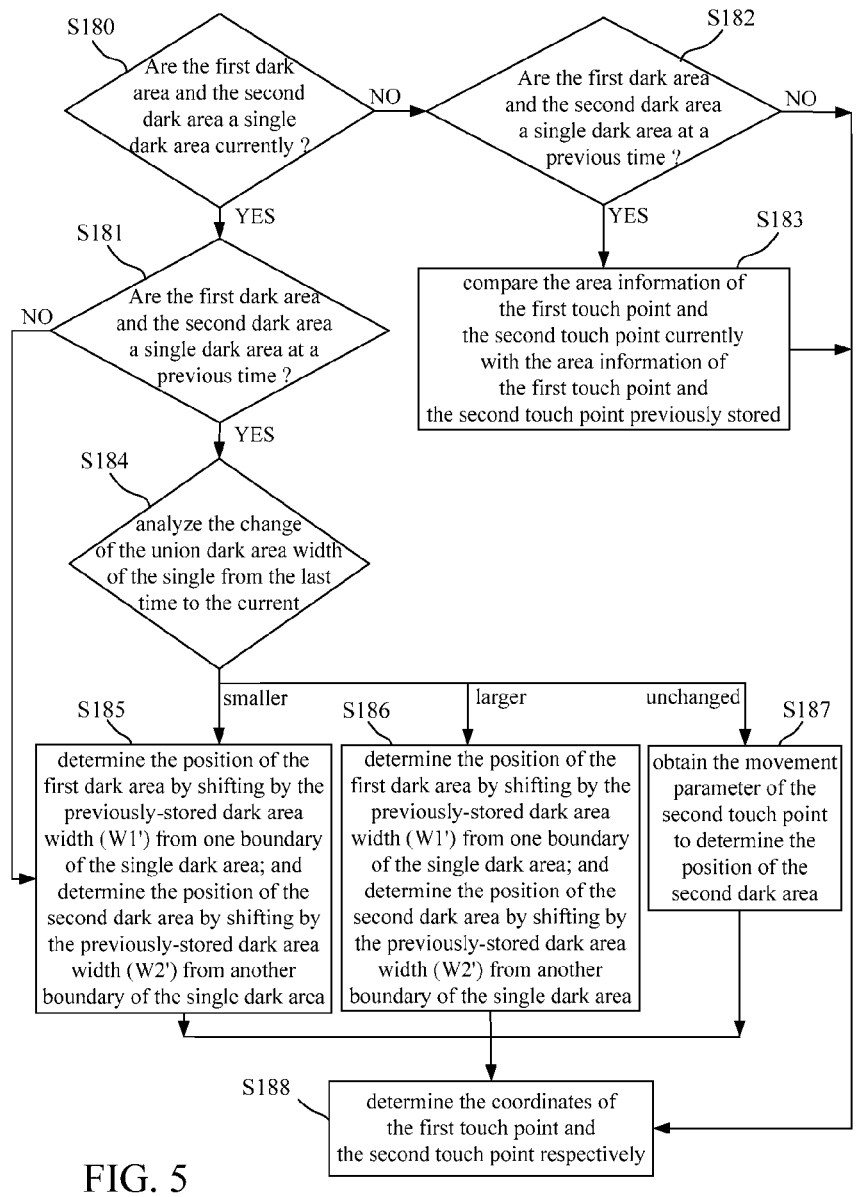
FIG. 5 is a flow chart of the system of distinguishing multiple touch points according to the invention.

Please refer to FIG. 5. FIG. 5 is a flow chart of the system of distinguishing multiple touch points according to the invention. The invention is applied to a system of distinguishing multiple touch points. The system of distinguishing multiple touch points includes a panel, a data processing module, and a camera unit. The panel is used for indicating a first touch point and a second touch point thereon. The camera unit is used for capturing an image relative to the first touch point and the second touch point and sending the image to the data processing module. The image has a first dark area and a second dark area corresponding to the first touch point and the second touch point respectively. A program is stored in the data processing module and is capable of being accessed by the data processing module to execute the following steps according to instructions within the program. Furthermore, the invention is also applied to a store medium. The store medium includes the instructions which are capable of being executed by a system of distinguishing multiple touch points to perform the following flow chart.

In the step S180, whether the first dark area and the second dark area are a single dark area currently is judged. If the judging in the step S180 is YES, the step S181 is executed to judge whether the first dark area and the second dark area are a single dark area at a previous time. It is noticed that the interval between the previous time and the current time is the interval of sampling by the camera unit. If the judging in the step S181 is NO (i.e. the current status is just entering the status of incompletely-shading before completely-shading P2"), the step S185 is executed to determine positions of the first dark area and the second dark area according to dark area widths previously stored. Afterward, the step S188 is executed to determine coordinates of the first touch point and the second touch point respectively.

If the judging in the step S181 is YES, the step S184 is executed to analyze the change of the union dark area width of the single dark area from the previous time to the current.

If the analyzed union dark area width becomes smaller (i.e. the current status is the status of incompletely-shading before completely-shading P2"), the step S185 is executed to determine the positions of the first dark area and the second dark area according to the dark area widths previously stored. Afterward, the step S188 is executed to determine the coordinates of the first touch point and the second touch point respectively. In an embodiment, the step S185 is to determine the position of the first dark area by shifting by the previously-stored dark area width (i.e. W1') from one boundary of the single dark area and also to determine the position of the second dark area by shifting by the previously-stored dark area width (i.e. W2') from another boundary of the single dark area.

If the analyzed union dark area width becomes larger (i.e. the current status is the status of incompletely-shading after completely-shading P2''''), the step S186 is executed to determine the positions of the first dark area and the second dark area according to the dark area widths previously stored. Afterward, the step S188 is executed to determine the coordinates of the first touch point and the second touch point respectively. In an embodiment, the step S186 is to determine the position of the first dark area by shifting by the previously-stored dark area width (i.e. W1') from one boundary of the single dark area and also to determine the position of the second dark area by shifting by the previously-stored dark area width (i.e. W2') from another boundary of the single dark area.

It is noticed that the boundaries and the directions of the shifting in the steps S185 and S186 are reversed. Please refer to FIG. 4C and FIG. 4E together. The step S185 is to determine the position of the second dark area by shifting rightward by the previously-stored dark area width W2' from the left boundary of the single dark area and to determine the position of the first dark area by shifting leftward by the previously-stored dark area width W1' from the right boundary of the single dark area. On the contrary, the step 186 is to determine the position of the second dark area by shifting leftward by the previously-stored dark area width W2' from the right boundary of the single dark area and to determine the position of the first dark area by shifting rightward by the previously-stored dark area width W1' from the left boundary of the single dark area.

If the analyzed union dark area width is unchanged (i.e. the current status is the completely shading status P2'''), the step S187 is executed to obtain the movement parameter of the second touch point and determine the position of the second dark area. Afterward, the step S188 is executed to determine the coordinates of the first touch point and the second touch point respectively. In an embodiment, the obtained movement parameter of the second touch point is determined according to a plurality of previously-stored coordinates of the second touch point and the times thereof.

Furthermore, if the judging in the step S180 is NO, the step S182 is executed to judge whether the first dark area and the second dark area are a single dark area at the previous time. If the judging in the step S182 is YES (i.e. the current status is the status of un-shading after completely-shading P2''''), the step S183 is executed to calculate a first area information and a second area information corresponding to the first touch point and the second touch point respectively and then to determine the coordinates of the first touch point and the second touch point respectively by comparing the previously-stored first area information and the previously-stored second area information with the current first area information and the current second area information. In an embodiment, the current first area information and the current second area information include area features associated with area, shape, circumference, and touch point width, and the previously-stored first area information and the previously-stored second area information also include area features associated with area, shape, circumference, and touch point width. The step S183 is to compare the current first area information and the current second area information with one of area, shape, circumference, and touch point width which are stored within the previously-stored first area information and the previously-stored second area information so as to determine the coordinates of the first touch point and the second touch point. If the judging in the step S182 is NO (i.e. the current status is not to be the mergence moment yet), the step S188 is directly executed to determine the coordinates of the first touch point and the second touch point.

As discussed above, the system and the method of optically distinguishing multiple touch points according to the invention provide prediction and tracing of movement path to each of the multiple touch points on the panel thereof on the basis of the maximum proximal principle of ergonomics, so it could avoid the error of misjudging the touch points. Therefore, compared with the prior art, the system and the method of optically distinguishing multiple touch points according to the invention could greatly improve the precision of position detection by optical touch input system.

With the example and explanations above, the features and spirits of the invention will be hopefully well described. Those skilled in the art will readily observe that numerous modifications and alterations of the device may be made while retaining the features and spirit of the invention. Accordingly, the above disclosure should be construed as limited only by the metes and bounds of the appended claims.

What is claimed is:

1. A method of distinguishing multiple touch points, applied to an optical touch system which comprises a panel for indicating a first touch point and a second touch point thereon and a camera unit for capturing an image relative to the first touch point and the second touch point, the image having a first dark area and a second dark area corresponding to the first touch point and the second touch point respectively, said method comprising the following steps of:
    (a) judging whether the first dark area and the second dark area are a first single dark area currently;
    (b) if the judging in the step (a) is YES, judging whether the first dark area and the second dark area are a second single dark area at a previous time;
    (c) if the judging in the step (b) is YES, determining a position of the first dark area and a position of the second dark area according to a union dark area width of the first single dark area and a union dark area width of the second single dark area;
    (d) determining coordinates of the first touch point and the second touch point according to the position of the first dark area and the position of the second dark area;
    (e) if the judging in the step (a) is NO, judging whether the first dark area and the second dark area are a third single dark area at the previous time; and
    (f) if the judging in the step (e) is YES, determining the positions of the first dark area and the second dark area by comparing current area information of the first touch point and the second touch point with previously-stored area information of the first touch point and the second touch point.

2. The method of claim 1, further comprising the following step of:
    if the judging in the step (b) is NO, determining the position of the first dark area by shifting by a previously-stored first dark area width along a first direction from a first boundary of the first single dark area, and determining the position of the second dark area by shifting by a previously-stored second dark area width along a second direction from a second boundary of the first single dark area.

3. The method of claim 2, wherein the step (c) comprises the following sub-steps of:
    (c1) if the union dark area width of the first single dark area is shorter than the union dark area width of the second single dark area, determining the position of the first dark area by shifting by the previously-stored first dark area width along the first direction from the first boundary of the first single dark area, and determining the position of the second dark area by shifting by the previously-stored second dark area width along the second direction from the second boundary of the first single dark area;
    (c2) if the union dark area width of the first single dark area is equal to the union dark area width of the second single dark area, determining the position of the second dark area according to a movement parameter of the second touch point; and
    (c3) if the union dark area width of the first single dark area is longer than the union dark area width of the second single dark area, determining the position of the second dark area by shifting by the previously-stored second dark area width along the first direction from the first boundary of the first single dark area, and determining the position of the first dark area by shifting by the previously-stored first dark area width along the second direction from the second boundary of the first single dark area.

4. The method of claim 3, wherein the first boundary is opposite to the second boundary, and the first direction is opposite to the second direction.

5. The method of claim 4, wherein the comparing in the step (f), comparing the current area information of the first touch point and the second touch point with the previously-stored area information of the first touch point and the second touch point, comprises at least one selected from the group consisting of area, shape, circumference, and touch point width.

6. The method of claim 3, wherein the movement parameter of the second touch point is determined according to a plurality of previously-stored coordinates and times of the second touch point.

7. A system of distinguishing multiple touch points, comprising:
- a panel, for indicating a first touch point and a second touch point thereon;
- a camera unit, for capturing an image relative to the first touch point and the second touch point, the image having a first dark area and a second dark area corresponding to the first touch point and the second touch point respectively;
- a data processing module, coupled to the panel and the camera unit; and
- a store unit, coupled to the data processing module and for storing area information corresponding to the first touch point and the second touch point respectively, a program being stored in the store unit and being capable of being accessed and executed by the data processing module, the program comprising:
- a first instruction, for judging whether the first dark area and the second dark area are a first single dark area currently;
- a second instruction, for if the judging in the first instruction is YES, judging whether the first dark area and the second dark area are a second single dark area at a previous time;
- a third instruction, for if the judging in the second instruction is YES, determining a position of the first dark area and a position of the second dark area according to a union dark area width of the first single dark area and a union dark area width of the second single dark area; and
- a fourth instruction, for determining coordinates of the first touch point and the second touch point according to the position of the first dark area and the position of the second dark area,
- if the judging in the second instruction is NO, determining the position of the first dark area by shifting by a previously-stored first dark area width along a first direction from a first boundary of the first single dark area, and determining the position of the second dark area by shifting by a previously-stored second dark area width along a second direction from a second boundary of the first single dark area.

8. The system of claim 7, wherein the third instruction comprises the following sub-instructions of:
- if the union dark area width of the first single dark area is shorter than the union dark area width of the second single dark area, determining the position of the first dark area by shifting by the previously-stored first dark area width along the first direction from the first boundary of the first single dark area, and determining the position of the second dark area by shifting by the previously-stored second dark area width along the second direction from the second boundary of the first single dark area;
- if the union dark area width of the first single dark area is equal to the union dark area width of the second single dark area, determining the position of the second dark area according to a movement parameter of the second touch point; and
- if the union dark area width of the first single dark area is longer than the union dark area width of the second single dark area, determining the position of the second dark area by shifting by the previously-stored second dark area width along the first direction from the first boundary of the first single dark area, and determining the position of the first dark area by shifting by the previously-stored first dark area width along the second direction from the second boundary of the first single dark area.

9. The system of claim 8, wherein the first boundary is opposite to the second boundary, and the first direction is opposite to the second direction.

10. The system of claim 8, wherein the movement parameter of the second touch point is determined according to a plurality of previously-stored coordinates and times of the second touch point.

11. The system of claim 10, further comprising the following instructions of:
- a fifth instruction, for if the judging in the first instruction is NO, judging whether the first dark area and the second dark area are a third single dark area at the previous time; and
- a sixth instruction, for if the judging in the fifth instruction is YES, determining the coordinates of the first touch point and the second touch point by comparing current area information of the first touch point and the second touch point with previously-stored area information of the first touch point and the second touch point.

12. The system of claim 11, wherein the comparing in the sixth instruction, comparing the current area information of the first touch point and the second touch point with the previously-stored area information of the first touch point and the second touch point, comprises at least one selected from the group consisting of area, shape, circumference, and touch point width.

13. The system of claim 7, further comprising the following instructions of:
- a fifth instruction, for if the judging in the first instruction is NO, judging whether the first dark area and the second dark area are a third single dark area at the previous time; and
- a sixth instruction, for if the judging in the fifth instruction is YES, determining the positions of the first dark area and the second dark area by comparing current area information of the first touch point and the second touch point with previously-stored area information of the first touch point and the second touch point.

14. A non-transitory storage medium storing a program therein, the program being capable of being accessed by a touch system which comprises a panel for indicating a first touch point and a second touch point thereon, a store unit for storing area information of the first touch point and the second touch point respectively and for storing a first dark area width and a second dark area width, and a camera unit for capturing an image relative to the first touch point and the second touch point, the image having a first dark area and a second dark area corresponding to the first touch point and the second touch point respectively, the program making the touch system execute the following steps of:
  (a0) judging whether an instruction is executed by the touch system;
  (a) if the judging in the step (a0) is YES, judging whether the first dark area and the second dark area are a first single dark area currently;

(b) if the judging in the step (a) is YES, judging whether the first dark area and the second dark area are a second single dark area at a previous time;

(c) if the judging in the step (b) is YES, determining a position of the first dark area and a position of the second dark area according to a union dark area width of the first single dark area and a union dark area width of the second single dark area;

(d) determining coordinates of the first touch point and the second touch point according to the position of the first dark area and the position of the second dark area, wherein the step (c) comprises the following sub-steps of:

(c1) if the union dark area width of the first single dark area is shorter than the union dark area width of the second single dark area, determining the position of the first dark area by shifting by the first dark area width along a first direction from a first boundary of the first single dark area, and determining the position of the second dark area by shifting by the second dark area width along a second direction from a second boundary of the first single dark area;

(c2) if the union dark area width of the first single dark area is equal to the union dark area width of the second single dark area, determining the position of the second dark area according to a movement parameter of the second touch point; and (c3) if the union dark area width of the first single dark area is longer than the union dark area width of the second single dark area, determining the position of the second dark area by shifting by the second dark area width along the first direction from the first boundary of the first single dark area, and determining the position of the first dark area by shifting by the first dark area width along the second direction from the second boundary of the first single dark area;

(e) if the judging in the step (a) is NO, judging whether the first dark area and the second dark area are a third single dark area at the previous time; and (f) if the judging in the step (e) is YES, determining the coordinates of the first touch point and the second touch point by comparing current area information of the first touch point and the second touch point with the area information of the first touch point and the second touch point stored in the store unit.

15. The non-transitory storage medium of claim 14, wherein the comparing in the step (f), comparing the current area information of the first touch point and the second touch point with the area information of the first touch point and the second touch point stored in the store unit, comprises at least one selected from the group consisting of area, shape, circumference, and touch point width.

* * * * *